[12] United States Patent
Wu (10) Patent No.: US 7,978,694 B2
(45) Date of Patent: *Jul. 12, 2011

(54) METHOD FOR TRANSMITTING LAYER 2 PACKET AND ACCESS DEVICE THEREOF (75) Inventor: Haijun Wu, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 736 days.

This patent is subject to a terminal disclaimer.

(21) Appl. No.: 11/596,491

(22) PCT Filed: May 17, 2006

(86) PCT No.: PCT/CN2006/001011
§ 371 (c)(1),
(2), (4) Date: Jan. 17, 2007

(87) PCT Pub. No.: WO2006/122502
PCT Pub. Date: Nov. 23, 2006

(65) Prior Publication Data
US 2008/0037561 A1    Feb. 14, 2008

(30) Foreign Application Priority Data

May 17, 2005   (CN) .......................... 2005 1 0070611

(51) Int. Cl.
*H04L 12/28* (2006.01)
*H04J 3/16* (2006.01)
*H04J 3/22* (2006.01)

(52) U.S. Cl. ........................................ 370/389; 370/469

(58) Field of Classification Search ........................ None
See application file for complete search history.

(56) References Cited

U.S. PATENT DOCUMENTS
5,612,959 A    3/1997   Takase et al.
(Continued)

FOREIGN PATENT DOCUMENTS
CN    1486037    3/2004
(Continued)

OTHER PUBLICATIONS

Cho, Jaihyung; "Label Switched Ethernet Technology"; Advanced Communication Technology, 2005; ICACT 2005; The 7th International Conference on Phoenix Park, Korea, Feb. 21-23, 2005; Piscataway, NJ, USA; IEEE; Feb. 21, 2005; pp. 619-623; XP010813714; ISBN: 89-5519-123-5.

(Continued)

*Primary Examiner* — Chirag G Shah
*Assistant Examiner* — Jenkey Van (57) ABSTRACT

A method for Layer 2 packet transmission is disclosed, wherein a corresponding relationship between packet attribute information and public MAC addresses is configured in an access device such that the access device could find a corresponding public MAC address in the corresponding relationship when receiving a packet from a user terminal, then replaces the source MAC address with the public MAC address found, and then sends the packet to a convergence layer device. A method for transmission of a Layer 2 packet without character information is also disclosed. The access device needs to obtain the packet attribute information and carry the information in the packet to be sent to the convergence layer device. An access device is also disclosed. As a result, the capacity of the VLAN and the MAC address table items needed for the convergence layer device to convert MAC addresses is greatly decreased.

3 Claims, 5 Drawing Sheets

U.S. PATENT DOCUMENTS

| | | | |
|---|---|---|---|
| 5,909,441 | A | 6/1999 | Alexander, Jr. et al. |
| 6,172,981 | B1 | 1/2001 | Cox et al. |
| 6,434,627 | B1* | 8/2002 | Millet et al. ............... 709/245 |
| 6,552,997 | B1* | 4/2003 | Inoue et al. ............... 370/217 |
| 6,971,044 | B2 | 11/2005 | Geng et al. |
| 7,249,194 | B2* | 7/2007 | Suzuki et al. ............... 709/238 |
| 7,457,300 | B2 | 11/2008 | Christensen et al. |
| 2002/0026528 | A1* | 2/2002 | Lo ............... 709/245 |
| 2003/0172143 | A1* | 9/2003 | Wakayama ............... 709/223 |
| 2004/0141468 | A1 | 7/2004 | Christensen et al. |
| 2004/0264458 | A1 | 12/2004 | Six |
| 2005/0076145 | A1 | 4/2005 | Ben-Zvi et al. |
| 2005/0147097 | A1* | 7/2005 | Chari et al. ............... 370/392 |
| 2006/0098644 | A1* | 5/2006 | Pullela et al. ............... 370/389 |
| 2006/0251075 | A1 | 11/2006 | Tams et al. |
| 2007/0076709 | A1 | 4/2007 | Mattson et al. |
| 2008/0080496 | A1 | 4/2008 | Slaight |

FOREIGN PATENT DOCUMENTS

| | | |
|---|---|---|
| CN | 1545265 | 11/2004 |
| CN | 1585346 | 2/2005 |
| CN | 1725725 A | 1/2006 |
| EP | 1492268 A1 | 12/2004 |
| KR | 2003092259 | 12/2003 |
| WO | 02/086712 A1 | 10/2002 |
| WO | 2006/057849 A2 | 6/2006 |
| WO | 2007/129056 A2 | 11/2007 |

OTHER PUBLICATIONS

Supplementary European Search Report for European Application No. 06741899.6, dated Jan. 21, 2008.

Haag, Jeffrey, et al.; "Simple PPP over Ethernet (sPPPoE)"; Networking Working Group; Internet Draft; <draft-haag-pppext-spp-poe-00.txt>; Feb. 2005; 1 page.

"Virtual MAC Address Translation Protocol"; International Telecommunication Union; COM 13-D 447-E; Telecommunication Standardization Sector; Study Period 2001-2004; Study Group 13—Delayed Contribution 445; ZTE Corporation; Geneva; Feb. 3-12, 2004; 1 page.

English translation of Written Opinion of the International Searching Authority of International Application No. PCT/CN2006/001011, dated Sep. 7, 2006.

Notice of Opposition for European Patent Application No. 06741899.6, dated Apr. 27, 2010.

Applicant's Comments on References Cited by EP Search Report.

"Applications of the CESoP Processors Packet Protocol Headers"; Application Note; ZLAN-116; Zarlink Semiconductor Inc.; Nov. 2004; 7 pages.

Response to Opposition of European Patent Application No. 06 741 899.6; dated Nov. 18, 2010; 22 pages.

* cited by examiner

METHOD FOR TRANSMITTING LAYER 2 PACKET AND ACCESS DEVICE THEREOF

FIELD OF THE TECHNOLOGY

The invention relates to the network communication technology, and particularly, to a method and an access device for transmitting a Layer 2 packet between an access device and a convergence layer device.

BACKGROUND OF THE INVENTION

Figure 1:
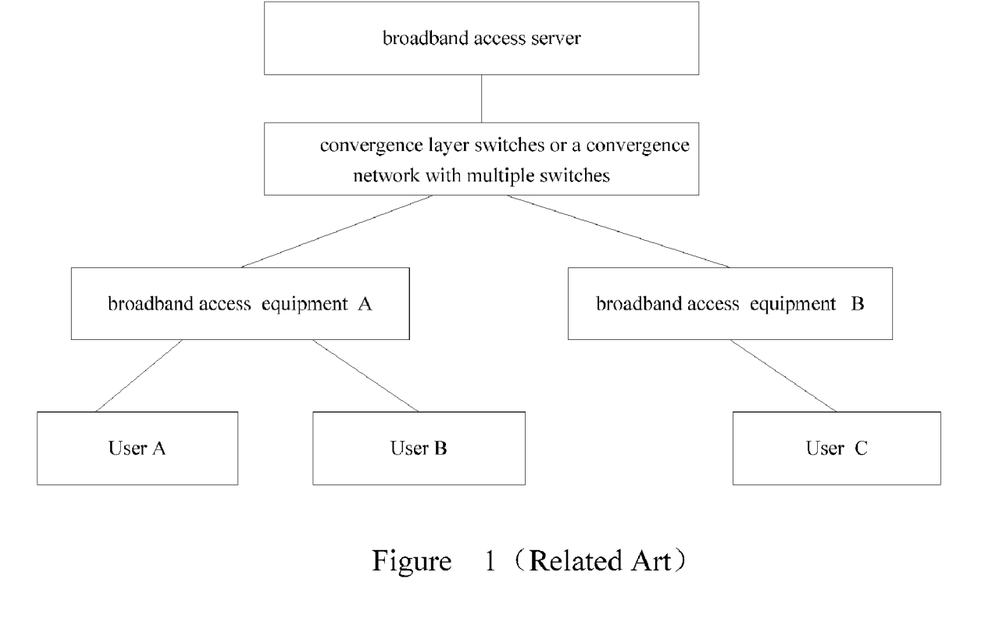
FIG. 1 is a schematic diagram illustrating the networking of the Ethernet.

At present, an Ethernet interface is used as an uplink interface in most broadband access networks and most convergence networks are the networks constructed based on Layer 2 or Layer 3 switches. As shown in FIG. 1, upon accessed by a user, the broadband access device gets connected with a centralized broadband access server (BRAS) or routing device through the convergence network. Usually, an Ethernet switch or a convergence device may be connected to several to dozens of broadband access devices and each broadband access device may be connected to as many as hundreds of user terminals. Therefore, the number of the users accessing the Layer 2 convergence network may be up to tens of thousands. However, the Ethernet switch performs the switch function based on a media access control (MAC) address and a virtual local area network (VLAN), and the Ethernet switches with MAC based forwarding table of 4k, 8k, 32k and 64k are used usually at present. Therefore, the switching table items that an Ethernet switch can accommodate are limited.

With the development of multiple services, a family accessing the network with broadband may have a plurality of service terminals and each terminal has a Layer 2 MAC address. As a result, the capacity of the VLAN and MAC address table items currently supported by the convergence network are unable to satisfy the demand of the service development.

To enable the convergence layer device to satisfy the demand of the service development, a method for performing Layer 3 routing in a broadband access device, such as a digital subscriber line access multiplexer (DSLAM), may be adopted. That is, upon receiving a Layer 2 packet from a user terminal, the broadband access device replaces a source Layer 2 MAC address in the packet with a Layer 3 interface MAC address thereof. In this way, the packet transmitted upward from the broadband access device only carries a Layer 3 interface MAC address of the broadband access device, thereby the demand for the MAC address forwarding table items associated with the convergence device in the network is dramatically decreased.

SUMMARY OF THE INVENTION

The present invention provides a method and an access device for transmitting a Layer 2 packet.

The method for transmitting a Layer 2 packet includes:
setting up corresponding relationship between packet attribute information and a public media access control (MAC) address and configuring the corresponding relationship in an access device;
the access device receiving a packet from a user terminal, finding the corresponding public MAC address from the corresponding relationship according to the attribute information of the packet, replacing a source MAC address in the packet with the public MAC address, and sending the packet to a convergence layer device.

The attribute information of the packet includes at least one of the type of a protocol adopted by the packet, the type of a link bearing the packet and the type of a user group to which the user terminal sending the packet belongs.

The method further includes: after the access device finds the corresponding public MAC address, the access device obtaining the character information of the packet and setting up an index relationship between the character information of the packet and the source MAC address of the packet.

The character information of the packet includes at least one of a source internet protocol (IP) address, a session identifier (ID) and a destination IP address of the packet.

The method further includes:
the access device receiving a packet from the convergence layer device, extracting the packet character information from the packet, finding the corresponding source MAC address from the index relationship according to the character information of the packet, and sending the packet to the user terminal.

A method for transmitting a Layer 2 packet carrying no character information, includes:
setting up corresponding relationship between packet attribute information and a public MAC address and configuring the corresponding relationship in an access device;
the access device receiving a packet carrying no character information from a user terminal, finding the corresponding public MAC address from the corresponding relationship according to the attribute information of the packet, replacing a source MAC address with the public MAC address, obtaining the character information of the packet, making the character information carried in the packet and sending the packet to a convergence layer device, and meanwhile, setting up an index relationship between the character information of the packet and the source MAC address of the packet.

The character information of the packet is user port information corresponding to the packet.

The user port information includes at least one of frame information, slot information and a port number of the access device receiving the packet, and the source MAC address of the packet.

The packet carrying no character information includes the first packet supporting a point-to-point protocol over Ethernet (PPPoE) or a Dynamic Host Configuration Protocol (DHCP) from the user terminal.

The character information of the packet is carried in an Immediate Relay Agent field when the packet carrying no character information is the first packet supporting the point-to-point protocol over Ethernet (PPPOE) from the user terminal.

The method further includes:
upon receiving the packet from the access device, the convergence device storing the character information carried in the packet and setting the character information in a downstream packet before sending the downstream packet to the access device; and
upon receiving the downstream packet, the access device extracting the character information from the packet, finding the source MAC address corresponding to the extracted character information according to the self-stored index relationship between the character information of the packet and the source MAC address, replacing the destination MAC address with the source MAC address and sending the packet to the corresponding user terminal.

In another aspect, this invention provides an access device, including an MAC address conversion module, for receiving an upstream packet from a user terminal, finding a public MAC address corresponding to the packet according to self-stored corresponding relationship between packet attribute information and the public MAC address, replacing a source MAC address of the upstream packet with the public MAC address and then sending the packet to a convergence layer device.

The MAC address conversion module is located in a hardware processing unit of the access device.

The access device further includes a user terminal MAC address determining module, for receiving a downstream packet from the convergence layer device, carrying character information of the packet in a user terminal MAC address request and sending the request to the user terminal MAC address conversion module, replacing a destination MAC address of the downstream packet with the user terminal MAC address returned by the user terminal MAC address conversion module and sending the packet to the corresponding user terminal;

wherein the user terminal MAC address conversion module is further for use in storing an index relationship between the packet character information and the source MAC address, finding the corresponding source MAC address in the index relationship upon receiving the user terminal MAC address request carrying the packet character information, and sending the source MAC address as the user terminal MAC address to the user terminal MAC address determining module.

The user terminal MAC address determining module is located in the hardware processing unit of the access device.

The access device further includes an application layer MAC address conversion module located in the software processing unit of the access device, for obtaining the public MAC address of the packet from the MAC address conversion module upon receiving the application layer associated upstream packet from the hardware processing unit of the access device, replacing the source MAC address of the packet with the obtained public MAC address and sending the packet to a forwarding module in the hardware processing unit of the access device.

The access device further includes an application layer user terminal MAC address determining module located in a software processing unit of the access device, for receiving the application layer associated downstream packet sent from the hardware processing unit of the access device, requesting the corresponding user terminal MAC address from the application layer MAC address conversion module according to the character information of the packet, replacing the destination MAC address of the downstream packet with the user terminal public MAC address returned from the application layer MAC address conversion module and sending the packet to the forwarding module in the hardware processing unit of the access device;

wherein the application layer MAC address conversion module is further for use in storing the index relationship between the packet character information and the source MAC address, and according to the request from the application layer user terminal MAC address determining module, returning the source MAC address corresponding to the packet character information sent from the application layer user terminal MAC address determining module as the application layer user terminal MAC address to the user terminal MAC address determining module.

The application layer MAC address conversion module further includes a user port information obtaining module, for receiving the upstream packet sent by the hardware processing unit and detecting the packet; if the packet contains no character information, acquiring the user port information of the packet from the hardware processing unit and regarding the acquired user port information as the character information of the packet.

In comparison with the prior art, according to this invention, a corresponding relationship between packet attribute information and public MAC address is set up and is configured on the access device. When receiving a packet from a user terminal, the access device finds the corresponding public MAC address from the corresponding relationship according to the attribute information of the packet, replaces the source MAC address with the public MAC address, and then sends the packet to the convergence layer device. As a result, the capacity of the VLAN and the MAC address table items needed for the convergence layer device to convert MAC addresses is dramatically decreased. Meanwhile, it is unnecessary for the access device to assign IP addresses for users, thereby facilitating the maintenance of the network.

EMBODIMENTS OF THE INVENTION

In the present invention, according to the attribute of the packets, an access device replaces the source MAC addresses of the packets having the same attribute with one public MAC address, and then sends the packets to a convergence device.

The invention will be further described in detail with reference to the accompanying drawings and preferred embodiments.

The transmission of Layer 2 packet mentioned above specifically includes the transmission of an upstream packet and the transmission of a downstream packet, which will be described hereinafter, respectively.

Figure 2:
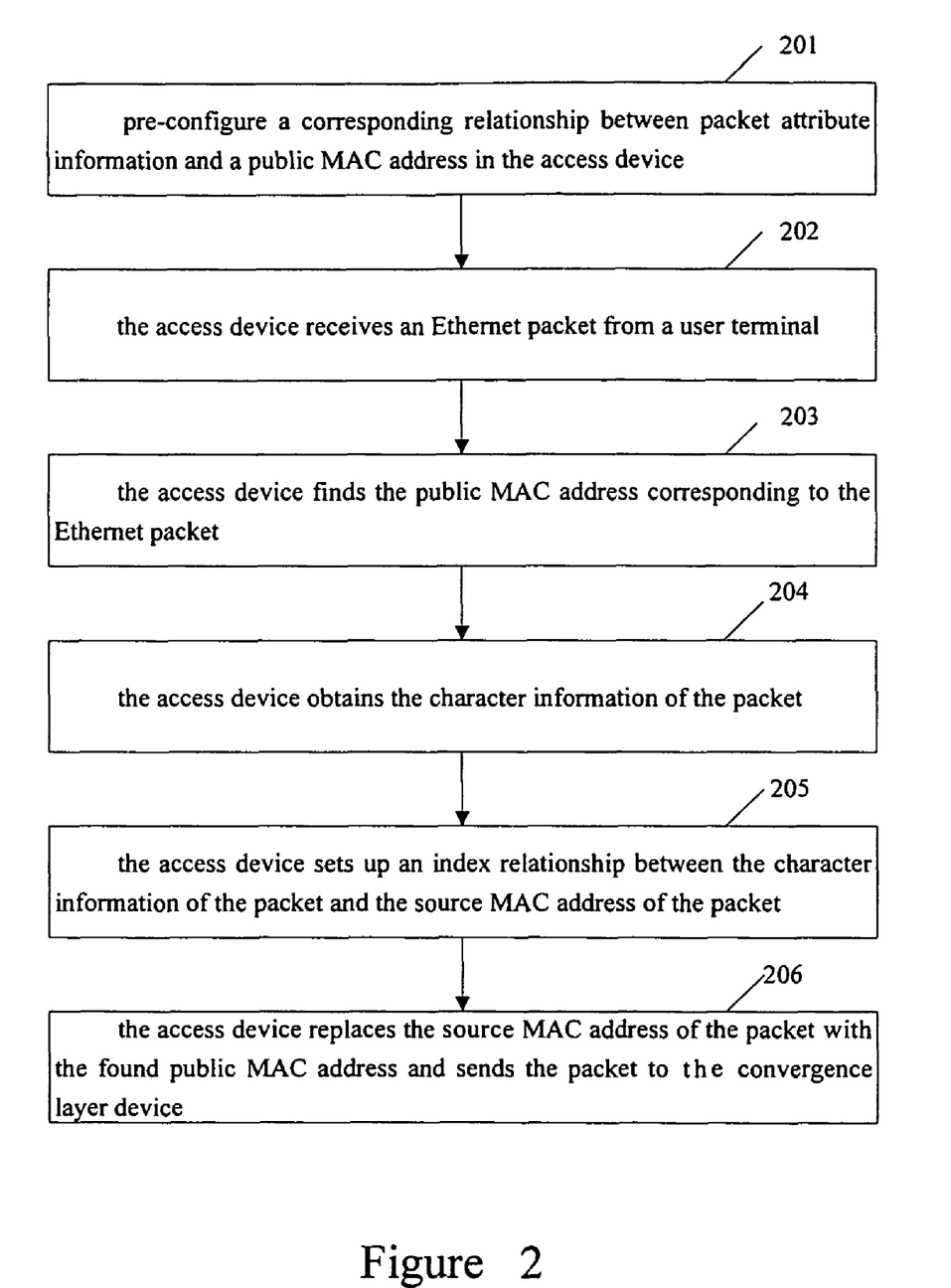
FIG. 2 is a flowchart for uplink transmission of a Layer 2 packet according to an embodiment of the invention.

FIG. 2 is a flowchart for uplink transmission of a Layer 2 packet according to an embodiment of the invention. As shown in FIG. 2, the specific steps are described as follows:

Step 201: Pre-configure a corresponding relationship between packet attribute information and public MAC address in an access device.

The packet attribute information may be the type of the protocol adopted by the packet, or the type of the link bearing the packet, such as the type of the permanent virtual channel (PVC) of the user terminal port, or the type of the user group to which the user terminal sending the packet belongs.

Step 202: The access device receives an Ethernet packet from a user terminal.

The Ethernet packet sent from the user terminal to the access device may be an IP over Ethernet (IPOE) packet, or a point-to-point protocol over Ethernet (PPPoE) packet, etc.

Step 203: The access device finds the public MAC address corresponding to the Ethernet packet from the corresponding relationship between packet attribute information and public MAC address according to the attribute information of the Ethernet packet, wherein the corresponding relationship between the packet attribute information and the public MAC address is configured in the access device.

For example, when the packet attribute information is the type of the permanent virtual channel (PVC) of the user terminal port, the MAC address 1 may be used as the public MAC address if the packet comes from the PVC1 of the user terminal port. Similarly, the MAC address 2 may be used as the public MAC address if the packet comes from the PVC2 of the user terminal port, and so on, wherein the user terminal is the terminal sending a packet.

Step 204: The access device obtains the character information of the packet.

The character information of the packet in this step must be the character information of uniqueness distinguishing the packet from others.

The character information may be obtained from the packet when the packet includes the unique character information therein. In this case, the character information of the packet may be a source internet protocol (IP) address, a session identifier (ID), or a destination IP address. For example, the source IP address of the packet may be extracted as the character information when the packet is an IPoE packet or an Address Resolution Protocol (ARP) request packet. The PPPoE session identifier or the source IP address may be extracted as the character information when the packet is a PPPoE packet. The destination IP address packet may be extracted as the character information when the packet is an ARP response packet.

The user port information corresponding to the packet may be used as the character information of the packet when the packet does not include the character information therein, e.g., the character information is not included in the first PPPoE packet or in the first Dynamic Host Configuration Protocol (DHCP) packet sent from a user terminal. The user port information may include the frame information, slot information and port number of the access device receiving the packet, or the user port information may be the source MAC address of the packet, or the user port information may include the frame information, slot information and port number of the access device receiving the packet as well as the source MAC address of the packet. The access device needs to add the user port information corresponding to the packet to the upstream packet, and then, the convergence device adds the user port information to the downstream packet when sending the downstream packet. For example, for the PPPoE uplink packet and downstream packet, the user port information may be added to an Immediate Relay Agent field such that the access device could find the user terminal MAC address corresponding to the destination MAC address of the downstream packet according to the user port information.

Step 205: The access device sets up an index relationship between the character information of the packet and the source MAC address of the packet.

The index relationship is used for converting the Layer 2 MAC address of the downstream packet.

Step 206: The access device replaces the source MAC address of the Ethernet packet with the found public MAC address, and then sends the packet to the convergence layer device.

It can be seen that the MAC address forwarding table items needing to be setup by the convergence layer device are greatly decreased because the access device replaces the source MAC addresses of the packets having the same attribute from the user terminal with one public MAC address, thereby achieving the objective of the invention.

Figure 3:
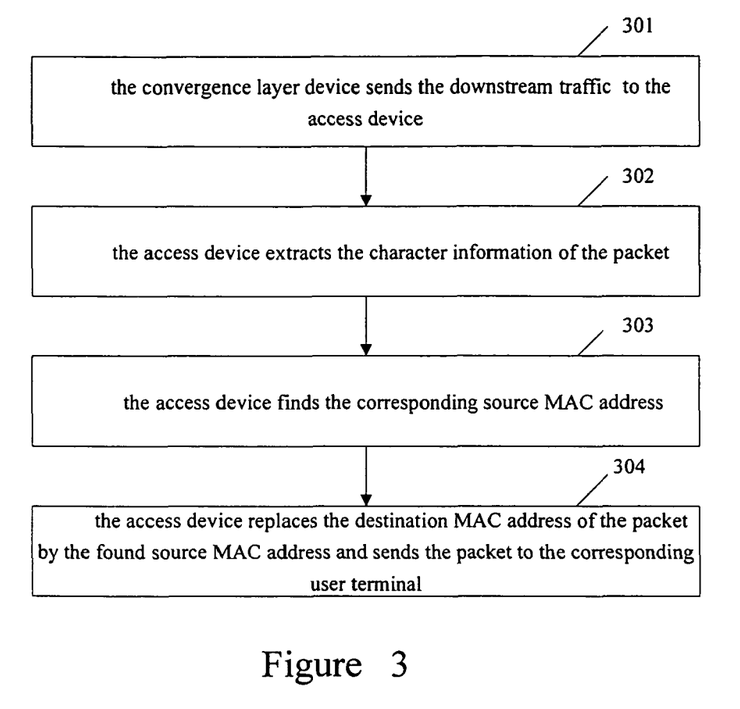
FIG. 3 is a flowchart for downlink transmission of a Layer 2 packet according to an embodiment of the invention.

FIG. 3 is a flowchart of transmission of a downlink Layer 2 packet according to an embodiment of the invention. As shown in FIG. 3, the detailed steps are described as follows:

Step 301: The convergence layer device sends a downstream packet to the access device.

If detecting that the upstream packet sent by the access device includes a special packet character information field, the convergence layer device determines that the upstream packet is a packet without the character information thereof. The convergence layer device stores the character information of the packet and adds the character information into the downstream packet when sending the corresponding downstream packet. For example, the character information of the packet may be added to the Immediate Relay Agent field of the downstream packet if the downstream packet is a PPPoE packet.

Step 302: Upon receiving the downstream packet, the access device extracts the character information of the packet.

The packet character information extracted in this step is the same as the packet character information adopted in the process of converting the MAC address of the upstream packet. For example, if the access device uses the source IP address of the upstream packet as the packet character information, the downstream packet character information extracted by the access device in this step should be the destination IP address of the packet. If the access device uses the session ID of the upstream packet as the packet character information, the downstream packet character information extracted by the access device in this step should also be the session ID of the packet. If the access device uses the destination IP address of the upstream packet as the packet character information, the downstream packet character information extracted by the access device in this step should be the source IP address of the packet. If the access device uses the user port information of the upstream packet as the packet character information, the packet character information extracted by the access device in this step should also be the user port information of the packet, and meanwhile, the field carrying the user port information should be deleted from the downstream packet.

Step 303: According to the extracted packet character information, the access device finds the source MAC address corresponding to the packet character information from the self-stored index relationship between the packet character information and the source MAC address, that is, the MAC address of the user terminal to which the packet is sent.

Step 304: The access device replaces the destination MAC address of the packet with the found source MAC address and sends the packet to the user terminal corresponding to the source MAC address.

In a special case, if the downstream packet is an ARP request packet, the access device broadcasts the packet directly to the corresponding user terminal after receiving the packet.

It can be seen that, by the process as shown in FIG. 3, the downstream packet corresponding to the upstream packet of which the MAC address has been converted is able to be sent to the user terminal accurately.

Based on the method provided in the invention, an access device is also disclosed.

Figure 4:
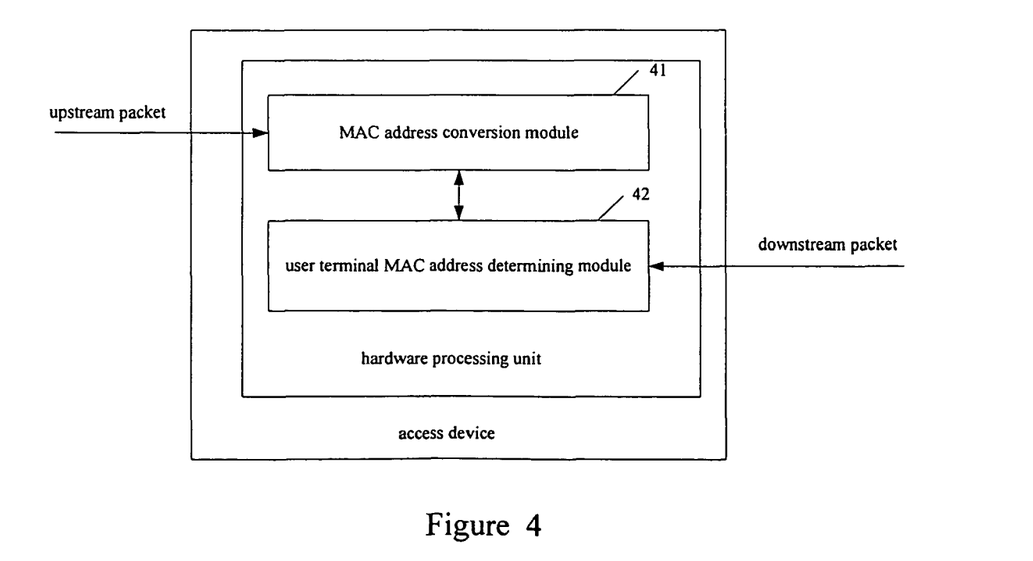
FIG. 4 is the first schematic diagram illustrating the structure of an access device for transmitting a Layer 2 packet according to an embodiment of the invention.

FIG. 4 is the first schematic diagram illustrating the structure of an access device transmitting a Layer 2 packet according to an embodiment of the invention. As shown in FIG. 4, the access device includes an MAC address conversion module 41 and a user terminal MAC address determining module 42.

The MAC address conversion module 41 serves to store the corresponding relationship between packet attribute information and public MAC addresses. Upon receiving an upstream packet sent by a user terminal, MAC address conversion module 41 finds the public MAC address corresponding to the packet according to the attribute information of the packet and the corresponding relationship thereof. Then MAC address conversion module 41 replaces the source MAC address of the packet with the public MAC address, sends the packet to the convergence layer device and then stores the index relationship between the packet character information and the source MAC. On the other hand, upon receiving a user terminal MAC address request which carries the packet character information from the user terminal MAC address determining module 42, the MAC address conversion module 41 returns the MAC address of the user terminal to the user terminal MAC address determining module 42.

The user terminal MAC address determining module 42 serves to extract the character information of the packet after receiving the downstream packet sent by the convergence layer device. The user terminal MAC address determining module 42 makes the packet character information carried in the user terminal MAC address request and sends the packet character information to the MAC address conversion module 41. Then, the user terminal MAC address determining module 42 replaces the destination MAC address with the user terminal MAC address returned by the MAC address conversion module 41 and sends the packet to the corresponding user terminal.

As an existing access device mainly includes a hardware processing unit and a software processing unit, wherein the hardware processing unit mainly serves to receive, analyze and forward a packet from the user side and the network side and meanwhile controls the extraction of the packet attribute information and the transmission of the packet, the MAC address conversion module 41 and the user terminal MAC address determining module 42 provided in an embodiment of the invention are set in the hardware processing unit.

Figure 5:
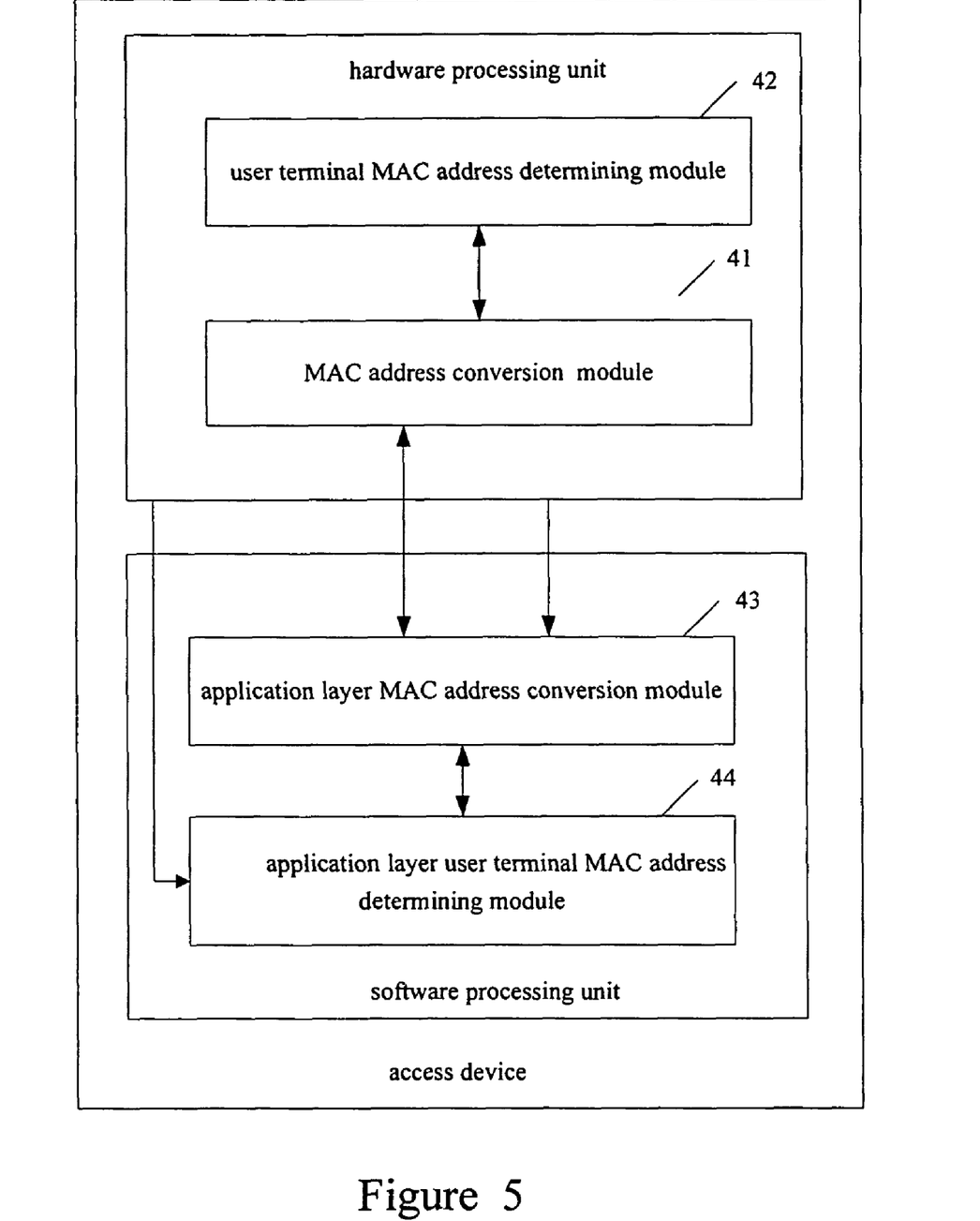
FIG. 5 is the second schematic diagram illustrating the structure of an access device for transmitting a Layer 2 packet according to an embodiment of the invention.

Furthermore, as shown in FIG. 5, the access device provided in an embodiment of the invention may includes an application layer MAC address conversion module 43 and an application layer user terminal MAC address determining module 44. The two modules are both located in the software processing unit for the Layer 2 MAC address conversion of an application layer associated packet.

The application layer MAC address conversion module 43 is for use in, upon receiving an application layer associated upstream packet sent by the hardware processing unit, sending a public MAC address request which carries the attribute information of the packet to the MAC address conversion module 41, replacing the source MAC address of the packet with the public MAC address returned by the MAC address conversion module 41, and then sending the packet to a forwarding module in the hardware processing unit of the access device. The forwarding module sends the packet to the convergence layer device and sets up the index relationship between the character information of the packet and the source MAC address of the packet. On the other hand, upon receiving the user terminal MAC address request sent by the application layer user terminal MAC address determining module 44, the application layer MAC address conversion module 43 regards the source MAC address corresponding to the packet character information as the MAC address of the user terminal and returns the source MAC address to the application layer user terminal MAC address determining module 44.

The application layer user terminal MAC address determining module 44, upon receiving the application layer associated downstream packet sent by the hardware processing unit of the access device, sets the character information of the packet in the user terminal MAC address request and sends it to the application layer MAC address conversion module 43, and replaces the destination MAC address of the downstream packet with the user terminal MAC address returned by the application layer MAC address conversion module 43. Then the application layer user terminal MAC address determining module 44 sends the packet to the forwarding module in the hardware processing unit of the access device, which sends the downstream packet to the corresponding user terminal.

Figure 6:
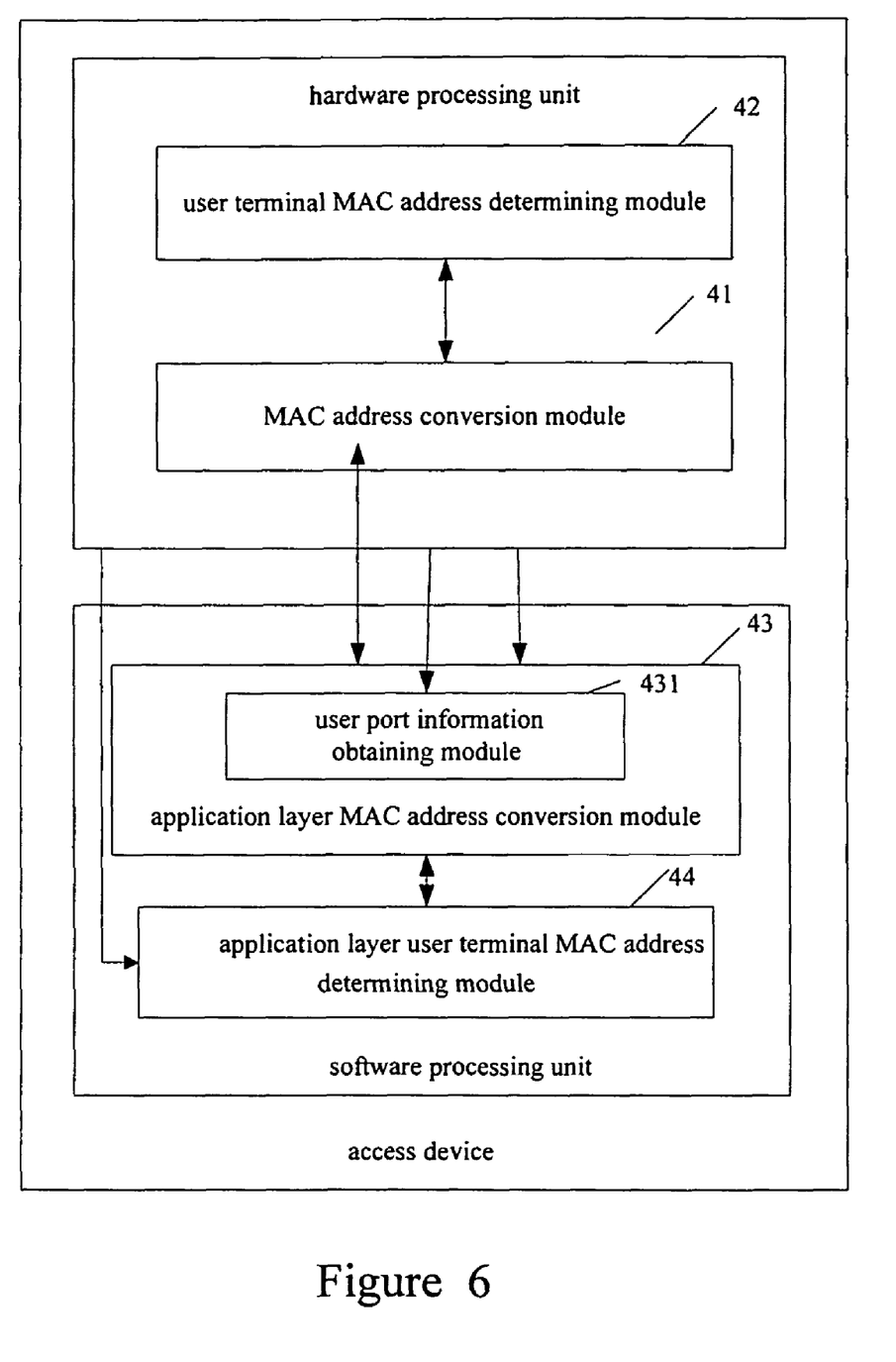
FIG. 6 is the third schematic diagram illustrating the structure of an access device for transmitting a Layer 2 packet according to an embodiment of the invention.

Furthermore, as shown in FIG. 6, the application layer MAC address conversion module 43 disclosed in the embodiment also includes a user port information obtaining module 431. The user port information obtaining module 431 serves to receive the application-associated upstream packet sent by the hardware processing unit and detects the packet. If detecting that the packet contains no character information, the user port information obtaining module 431 acquires the user port information of the packet from the hardware processing unit and regards the user port information returned by the hardware processing unit as the character information of the packet.

The forgoing is only preferred embodiments of the present invention and is not intended to limit the present invention. Any modification, equivalent replacement, and improvement within the spirit and principle of this invention should be covered by the protection scope of the invention as defined by the appended claims.

What is claimed is:

1. An access device comprising:
    an application layer MAC address conversion module located in a software processing unit of the access device, for obtaining the public MAC address of the packet from the MAC address conversion module upon receiving the application layer associated upstream packet from a hardware processing unit of the access device, obtaining character information of the packet, setting index relationship between the character information of the packet and the source MAC address of the packet, wherein the character information of the packet is the information of uniqueness distinguishing the packet from others, replacing the source MAC address of the packet with the obtained public MAC address, and sending the packet to a forwarding module in the hardware processing unit of the access device;
    an application layer user terminal MAC address determining module located in the software processing unit of the access device, configured to receive the application layer associated downstream packet sent from the hardware processing unit of the access device, request the corresponding user terminal MAC address from the application layer MAC address conversion module according to the character information of the packet, replace the destination MAC address of the downstream packet with the user terminal MAC address returned from the application layer MAC address conversion module, and send the packet to the forwarding module in the hardware processing unit of the access device;
    wherein the application layer MAC address conversion module is further configured to set the index relationship between the packet character information and the source MAC address, and according to the request from the application layer user terminal MAC address determining module, return the source MAC address corresponding to the packet character information sent from the application layer user terminal MAC address determining module as the user terminal MAC address to the application layer user terminal MAC address determining module.

2. The access device according to claim 1, wherein the application layer MAC address conversion module further comprises a user port information obtaining module configured to receive the upstream packet sent by the hardware processing unit and detecting whether the packet containing a character information; if the packet contains no character information, the user port information obtaining module acquires the user port information of the packet from the hardware processing unit and regards the acquired user port information as the character information of the packet.

3. An access device, comprising:

an MAC address conversion module, for receiving a packet from a user terminal, finding a public MAC address corresponding to the packet according to self-stored corresponding relationship between packet attribute information and the public MAC address, replacing a source MAC address of the packet with the public MAC address, obtaining character information of the packet, setting index relationship between the character information of the packet and the source MAC address of the packet, wherein the character information of the packet is the information of uniqueness distinguishing the packet from others, and then sending the packet to a convergence layer device;

a user terminal MAC address determining module, for receiving a packet from the convergence layer device, carrying character information of the packet in a user terminal MAC address request and sending the request to the MAC address conversion module, replacing a destination MAC address of the packet with the user terminal MAC address returned by the MAC address conversion module and sending the packet to the corresponding user terminal;

wherein the MAC address conversion module is further for use in finding the corresponding source MAC address in the index relationship upon receiving the user terminal MAC address request carrying the character information of the packet, and sending the source MAC address as the user terminal MAC address to the user terminal MAC address determining module;

wherein the user terminal MAC address determining module is located in the hardware processing unit of the access device.

* * * * *